(12) United States Patent
Ohrbom et al.

(10) Patent No.: US 6,541,594 B2
(45) Date of Patent: Apr. 1, 2003

(54) COATING COMPOSITIONS CONTAINING CROSSLINKABLE MONOMERIC DIFUNCTIONAL COMPOUNDS HAVING AT LEAST THIRTY CARBON ATOMS

(75) Inventors: Walter H. Ohrbom, Hartland Township, MI (US); John A. Gilbert, Brighton, MI (US); Patricia A. Herrel, Hartland Township, MI (US); Marvin L. Green, Brighton, MI (US); Joanne Casale, Warren, MI (US); Thomas G. Savino, Northville, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/741,511

(22) Filed: Dec. 19, 2000

(65) Prior Publication Data

US 2002/0119253 A1 Aug. 29, 2002

(51) Int. Cl.$^7$ .............................................. C08G 18/00
(52) U.S. Cl. .................... 528/45; 568/852; 568/420; 568/700; 525/333.7; 525/191; 525/55; 528/68; 528/332; 528/254; 556/32; 556/211
(58) Field of Search ................ 568/852, 420; 525/55, 333.7, 191, 211; 528/45, 68, 332, 254; 556/32

(56) References Cited

U.S. PATENT DOCUMENTS

| | | | |
|---|---|---|---|
| 4,118,427 A | * 10/1978 | Rhein et al. | |
| 4,246,376 A | 1/1981 | Didomenico, Jr. | ........... 525/398 |
| 4,546,120 A | 10/1985 | Perrman et al. | ............ 521/159 |
| 5,334,650 A | 8/1994 | Serdiuk et al. | ............. 524/591 |
| 5,587,428 A | 12/1996 | Jones et al. | ................. 525/165 |
| 5,688,867 A | 11/1997 | Scheibelhoffer et al. | .... 525/168 |
| 5,783,272 A | * 7/1998 | Wong | |

FOREIGN PATENT DOCUMENTS

| | | |
|---|---|---|
| EP | WO 95/19997 | 7/1995 |
| EP | WO 96/23034 | 8/1996 |
| EP | WO 96/23035 | 8/1996 |
| EP | WO 99/35189 | 7/1999 |

OTHER PUBLICATIONS

Frank N. Jones, "End–Grafting of Oligoesters Based on Terephthalic Acid and Linear Diols for High Solids Coatings", Apr. 21, 1995, pp. 1609–1618.

Robson F. Storey et al., "Proceedings of the twenty–fourth international waterborne, high–solids, and powder coatings symposium", Feb. 5–7, 1997, pages title, & 1–21.

Frank N. Jones et al. "Recent Studies of self–condensation and co–condensation of melamine–formaldehyde resins; cure at low temperatures", (1994), pp. 189–208.

Robson F. Storey et al., "Proceedings of the twenty–fourth international waterborne, high–solids, and powder coatings symposium", Feb. 21–23, 1990, pages title, & 447–470.

Shubang Gan et al, "Recent studies of the curing of polyerester–melamine enamels, possible causes of overbake softening", Feb. 1–3, 1989, pp. 87–109.

* cited by examiner

Primary Examiner—Robert Dawson
Assistant Examiner—Kuo-Liang Peng
(74) Attorney, Agent, or Firm—Mary E. Golota

(57) ABSTRACT

The invention provides coating compositions comprising a reactive component (a) which is substantially free of any heteratoms and is a not a crystalline solid at room temperature and which comprises from (i) 12 to 72 carbon atoms, and (ii) at least two functional groups, and (b) a crosslinking agent comprising a plurality of functional groups (iii) reactive with the functional groups (ii) of compound (a), wherein functional groups (ii) and (iii) are selected such that reaction there between produces a thermally irreversible chemical linkage. The coating compositions of the invention provide improved solids, chip resistance, flexibility and/or scratch & mar resistance while maintaining desirable and/or improved performance characteristics with regard to environmental etch, relative humidity, QCT, chip resistance, thermoshock resistance, cold crack resistance, adhesion and the like.

66 Claims, No Drawings

COATING COMPOSITIONS CONTAINING CROSSLINKABLE MONOMERIC DIFUNCTIONAL COMPOUNDS HAVING AT LEAST THIRTY CARBON ATOMS

FIELD OF THE INVENTION

This invention relates to coating compositions, especially thermoset coating compositions intended for use in the automotive and/or transportation industries.

BACKGROUND OF THE INVENTION

Curable coating compositions such as thermoset coatings are widely used in the coatings art. They are often used as topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings such as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings.

It has been found that carbamate functional polymers such as those described in U.S. Pat. Nos. 5,726,246, 5,474,811, and 5,605,965 can be used to provide coating compositions which exhibit significantly improved environmental etch resistance. Carabamate functional polymers have been used to provide commercially advantageous coatings compositions, especially as clearcoats intended for use in composite color-plus-clear coatings.

However, although coating compositions containing carbamate functional polymers generally provide the performance properties currently required by the automotive industry, continuous improvement is always desired. As a result, it would be advantageous to provide improvements in solids or % nonvolatile, flexability, scratch & mar resistance, cold crack resistance, chip resistance and/or the like. At the same time, such improvements must be achieved without any decrease in environmental etch resistance or other commercially required performance property.

It would also be desireable to provide such a technology which would be applicable for use in a wide variety of coating compositions and applications, such as primers, basecoats, clearcoats, two-component systems, anti-chip coating compositions, water borne coatings, solvent borne coatings, coatings for flexible substrates, and the like.

Finally, it would be advantegous to provide improved etch resistant coating compositions which have an increased % NV (nonvolatile) or decreased VOC (volatile organic content) at a sprayable viscosity.

Accordingly, it is an object of the instant invention to provide curable coating compositions which provide all of the advantages of prior art carbamate containing coating compositions, especially good environmental etch resistance, but further exhibit improvement in one or more of the following performance parameters, i.e., flexability, scratch and mar resistance, and/or chip resistance.

It is another object of the invention to provide a technology for improving one or more of the following performance parameters, i.e., % nonvolatile solids, flexability, scratch and mar resistance, and/or chip resistance, in a wide variety of coating compositions and applications, such as primers, basecoats, clearcoats, two-component systems, anti-chip coating compositions, water borne coatings, solvent borne coatings, coatings for flexible substrates, and the like.

It is another object of the invention to provide etch resistance coating compositions which have an increased % NV (nonvolatile) or decreased VOC (volatile organic content) at a sprayable viscosity.

SUMMARY OF THE INVENTION

It has unexpectedly been found that these and other objects of the invention can be achieved with the use of a particular component (a), especially when used in conjunction with a particular crosslinking agent (b).

The invention provides curable coating compositions comprising (a) a reactive component which is substantially free of any heteroatoms and is not a crystalline solid at room temperature comprising (i) from 12 to 72 carbon atoms, and (ii) at least two functional groups, and (b) a crosslinking agent comprising a plurality of functional groups (iii) reactive with the functional groups (ii) of compound (a), wherein functional groups (ii) and (iii) are selected such that reaction of functional groups (ii) and (iii) produces a thermally irreversible chemical linkage.

In a preferred embodiment of the invention, reactive component (a) will be a liquid or a waxy solid at temperatures of less than 20 degrees C. Most preferably, reactive component (a) will comprise a mixture of reactive components selected from the group consisting of linear aliphatic reactive components, aromatic containing reactive components, and cycloaliphatic containing reactive components.

In another aspect of the invention, the claimed coating compositions will further comprise one or more polyfunctional polymeric compounds (c) and one or crosslinking agents (d). The one or more polyfunctional polymeric compounds (c) are different from (a) and have one or more hydrogen reactive functional groups (iv) and an equivalent weight of from 116 to 2000. The one or more crosslinking agents (d) comprise a plurality of functional groups (v) reactive with the functional groups (iv) of compound (c).

DETAILED DESCRIPTION OF THE PREFERRED EMBODIMENTS

In its broadest embodiment, the instant invention comprises coating compositions comprising a reactive component (a) and a crosslinking agent (b). Reactive component (a) should have from 12 to 72 carbons, have at least two functional groups (ii), be substantially free of heteroatoms, and not be a crystalline solid at room temperature. Crosslinking agent (b) must have a plurality of functional groups reactive with functional groups (ii) of reactive component (a). Functional groups (ii) of reactive component (a) must form a chemically irreversible linkage upon reaction with the functional groups (iii) of crosslinking agent (b).

The term "thermally irreversible linkage" refers to a linkage the reversal of which is not thermally favored under the traditional cure schedules used for automotive coating compositions. Illustrative examples of suitable thermally irreversible chemical linkages are urethanes, ureas, esters and ethers. Preferred thermally irreversible chemical linkages are urethanes, ureas and esters, with urethane linkages being most preferred. Such chemical linkages will not break and reform during the crosslinking process as is the case with the linkages formed via reaction between hydroxyl groups and aminoplast resins. The prior art has previously taught that the reversibility of crosslink bonds is both desireable and indeed critical to the success of aminoplast containing coatings. See Possible Reaction Pathways for Self-Condensation of Melamine Resins; Reversibility of Methylene Bridge Formation, Samaraweera U., *Journal of Coatings Technology*, Vol. 64, No. 804, January 1992.

The reactive component (a) of the invention will generally have from 12 to 72 carbons, more preferably from 18 to 54 carbons, and most preferably from 36 to 54 carbons. In a particularly preferred embodiment of the invention, the reactive component (a) will have 36 carbons.

"Heteroatoms" as used herein refers to atoms other than carbon or hydrogen. The phrase "substantially without" heteroatoms as used herein means that the portion of reactive component (a) which does not include functional groups (ii) will generally have no more than two atoms which are other than carbon or hydrogen, i.e., atoms such as N, O, Si, mixtures thereof, and the like. More preferably, that portion of reactive component (a) that does not include functional groups (ii) will have no more than one atom that is other than carbon or hydrogen. In a most preferred embodiment, that portion of reactive component (a) that does not include functional groups (ii) will have no heteroatoms, i.e., will consist solely of carbon and hydrogen atoms. Thus, in a most preferred aspect of the invention, the only heteroatoms in reactive component (a) will be present in functional groups (ii).

It is another aspect of the invention that reactive component (a) will not be a crystalline solid at room temperature, i.e., at temperatures of from 65 to 75° F. "Crystalline" refers to a solid characterized by a regular, ordered arrangement of particles. Rather, reactive component (a) will be an amorphous solid, a wax or a liquid at room temperature. "Amorphous" refers to a noncrystalline solid with no well-defined ordered structure.

In a more preferred embodiment of the invention, reactive component (a) will comprise a mixture of two or more saturated or unsaturated structures selected from the group consisting of noncyclic structures for reactive component (a), aromatic-containing structures for reactive component (a), cyclic-containing structures for reactive component (a), and mixtures thereof. Saturated structures are preferred, especially where durability issues are of concern. For example, a most preferred reactive component (a) will comprise a mixture of two or more structures selected from the group consisting of aliphatic structures for reactive component (a), aromatic-containing structures for reactive component (a), cycloaliphatic-containing structures for reactive component (a), and mixtures thereof It is particularly preferred that reactive component (a) comprise at least two, more preferably three, of the three cited structures. If reactive component (a) comprises only two of the three cited structures for reactive component (a), then at least one of the two structures must be present as a mixture of two or more isomers thereof.

For example, the mixture of reactive components (a) may comprise at least one aliphatic structure for reactive component (a) and at least one other structure for reactive component (a) selected from the group consisting of aromatic-containing structures for reactive component (a), cycloaliphatic-containing structures for reactive component (a), and mixtures thereof If the 'at least one other structure for reactive component (a)' is not a mixture of aromatic-containing structures for reactive component (a) and cycloaliphatic-containing structures for reactive component (a), either the aromatic-containing structures or the cycloaliphatic containing structures must be present as a mixture of two or more isomers.

Alternatively, the mixture of reactive components (a) may comprise at least one aromatic-containing structure for reactive component (a) and at least one other structure for reactive component (a) selected from the group consisting of aliphatic structures for reactive component (a), cycloaliphatic-containing structures for reactive component (a), and mixtures thereof. If the 'at least one other structure for reactive component (a)' is not a mixture of aliphatic structures for reactive component (a) and cycloaliphatic-containing structures for reactive component (a), either the aliphatic structures or the cycloaliphatic containing structures must be present as a mixture of two or more isomers.

In a most preferred embodiment, reactive component (a) will comprise one or more aliphatic structures for reactive component (a), one or more aromatic-containing structures for reactive component (a), and one or more cycloaliphatic-containing structures for reactive component (a). Particularly advantageous mixtures of reactive component (a) will comprise from 3 to 25% by weight of reactive component (a) having an aliphatic structure, from 3 to 25% by weight of reactive component (a) having an aromatic-containing structure, and 50 to 94% by weight of reactive component (a) having a cycloaliphatic-containing structure. More preferred mixtures of reactive component (a) will comprise from 3 to 18% by weight of reactive component (a) having an aliphatic structure, from 5 to 23% by weight of reactive component (a) having an aromatic-containing structure, and 55 to 85% by weight of reactive component (a) having a cycloaliphatic-containing structure. Most preferred mixtures of reactive component (a) will comprise from 5 to 10% by weight of reactive component (a) having an aliphatic structure, from 10 to 20% by weight of reactive component (a) having an aromatic-containing structure, and 60 to 70% by weight of reactive component (a) having a cycloaliphatic-containing structure.

Finally, reactive component (a) must comprise at least two functional groups (ii). Preferred reactive components (a) may have from two to six functional groups (ii) while most preferably reactive component (a) will have two to three functional groups (ii).

Functional groups (ii) may be selected from a wide variety of active hydrogen containing groups and groups reactive with such active hydrogen containing groups. While active hydrogen containing groups are preferred, functional group (ii) may be any one of a pair of reactants which would result in a thermally irreversible chemical linkage such as is described above, i.e., urethane, urea, ester, and ether. It will be appreciated that if one member of a "pair" is selected for use as functional group (ii), the other member of the "pair" must be selected as functional group (iii) of crosslinking agent (b). As indicated above, the reaction of functional groups (ii) and (iii) must produce a thermally irreversible chemical linkage. Examples of illustrative reactant "pairs" are hydroxy/isocyanate (blocked or unblocked), hydroxy/epoxy, carbamate/aminoplast, carbamate/aldehyde, acid/epoxy, amine/cyclic carbonate, amine/isocyanate (blocked or unblocked), urea/aminoplast, and the like.

Thus, illustrative functional groups (ii) may be selected from the group consisting of carboxyl, hydroxyl, aminoplast functional groups, urea, carbamate, isocyanate, (blocked or unblocked), epoxy, cyclic carbonate, amine, aldehyde and mixtures thereof. Preferred functional groups (ii) are hydroxyl, primary carbamate, isocyanate, aminoplast functional groups, epoxy, carboxyl and mixtures thereof. Most preferred functional groups (ii) are hydroxyl, primary carbamate, and mixtures thereof.

Aminoplast functional groups may be defined as those functional groups resulting from the reaction of an activated amine group and an aldehyde or a formaldehyde. Illustrative activated amine groups are melamine, benzoguanamine, amides, carbamates, and the like. The resulting reaction product may be used directly as functional group (ii) or may be etherified with a monofunctional alcohol prior to use as functional group (ii).

Amine groups suitable for use as functional group (ii) may be primary or secondary, but primary amines are most preferred.

Illustrative examples of suitable reactive components (a) having functional groups (ii) which are carboxyl are fatty acids and addition reaction products thereof, such as dimerized, trimerized and tetramerized fatty acid reaction products and higher oligomers thereof. Suitable acid functional dimers and higher oligomers may be obtained by the addition reaction of C12–18 monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commerically available from Uniquema of Wilmington, Del.

Hydroxyl functional reactive components (a) are commercially available as the Pripol™ saturated fatty acid dimer (PripolTM 2033) supplied by Uniqema of Wilmington, Del. Hydroxyl functional reactive components (a) may also be obtained by reduction of the acid group of the above discussed fatty acids.

Reactive components (a) having two or more carbamate functional groups may be obtained via the reaction of the hydroxyl functional reactive components (a) with a low molecular weight carbamate functional monomer such as methyl carbamate under appropriate reaction conditions. Alternatively, carbamate functional reactive components (a) may be made via decomposition of urea in the presence of hydroxyl functional reactive component (a) as described above. Finally, carbamate functional reactive components (a) can be obtained via the reaction of phosgene with the hydroxyl functional reactive component (a) followed by reaction with ammonia.

Reactive components (a) having amine functional groups (ii) may be obtained via reaction of the acid functional component (a) to form an amide, followed by conversion to a nitrile and subsequent reduction to an amine.

Reactive components (a) having isocyanate functional groups (ii) made be obtained via reaction of the amine functional component (a) described above with carbon dioxide.

Reactive components (a) having aminoplast functional groups (ii) may be made via reaction of carbamate or amide functional reactive component (a) as described above with formaldehyde or aldehyde. The resulting reaction product may optionally be etherified with low boiling point alcohols.

Reactive components (a) having aldehyde functional groups (ii) may be made via reduction of the acid functional reactive components (a) described above.

Reactive components (a) having urea functional groups (ii) may be made via reaction of an amine functional component (a) with urea. Alternatively, amine functional component (a) can be reacted with phosgene followed by reaction with ammonia to produce the desired urea functional groups (ii).

Reactive components (a) having epoxy functional groups (ii) may be made using either saturated or unsaturated fatty acids described above. If an unsaturated fatty acid is used, reaction with peroxide will form internal epoxy groups. More preferably, an acid or hydroxyl functional reactive component (a) will be reacted with epichlorohydrin. Preferred epoxy functional reactive components (a) will be obtained using saturated starting materials.

Reactive components (a) having cyclic carbonate functional groups (ii) may be made via carbon dioxide insertion into an epoxy functional reactive component (a) as described above.

A preferred example of for reactive component (a) will have the following structures therein:

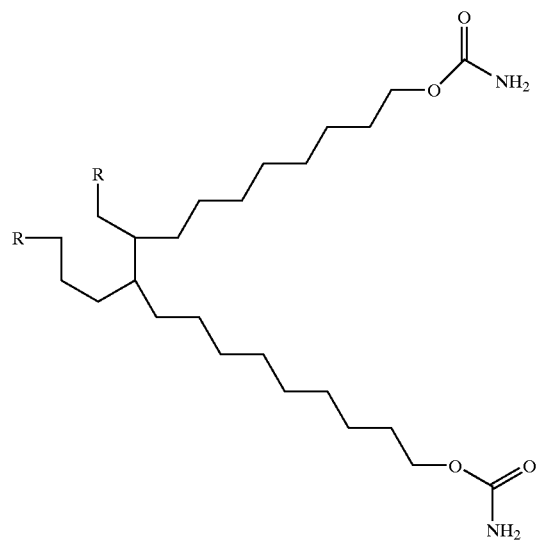

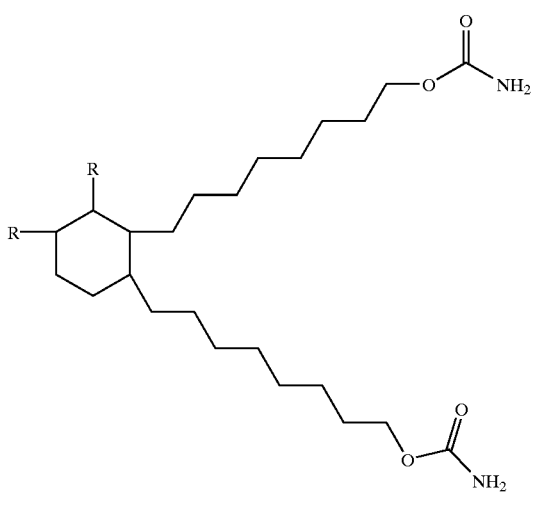
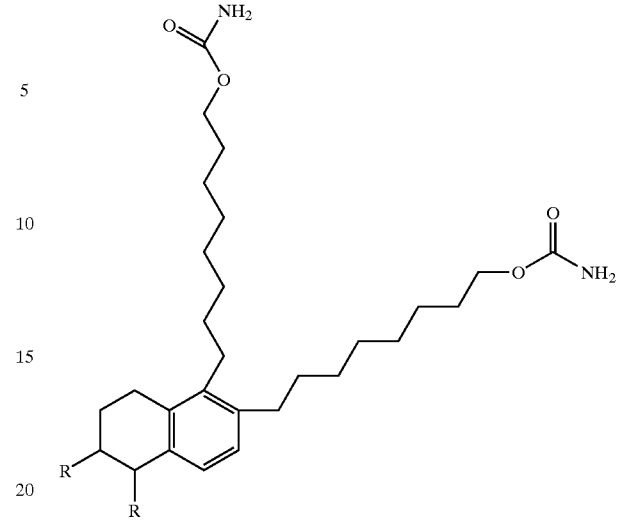
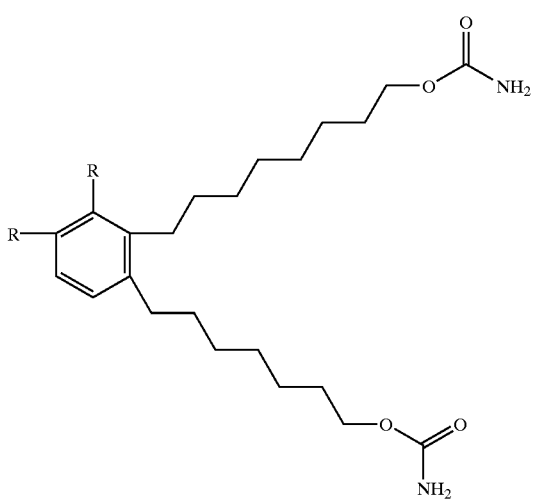

R=C₅—C₈

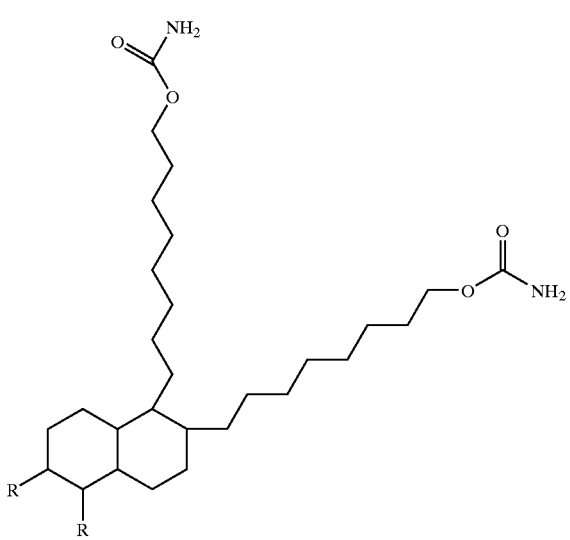

For the coating compositions of the invention, reactive component (a) must be combined with a particular crosslinking agent (b). Crosslinking agent (b) must have a plurality of functional groups (iii) which are reactive with the functional groups (ii) of reactive component (a). The functional groups (ii) and (iii) must be selected so that the reaction product thereof is a thermally irreversible chemical linkage such as is described above.

It will be appreciated that the selection of functional groups (iii) of crosslinking agent (b) is therefore dependent upon the identify of the functional groups (ii) of reactive component (a).

For example, when functional groups (ii) are hydroxyl, functional groups (iii) of crosslinking agent (b) may be selected from the group consisting of isocyanate (blocked or unblocked), epoxy, and mixtures thereof, and most preferably will be isocyanate groups, whether blocked or unblocked.

Illustrative examples of epoxy functional crosslinking agents (b) are all known epoxy functional polymers and oligomers. Preferred epoxy functional crosslinking agents are glycidyl methacrylate polymers and isocyanurate containing epoxy functional polymers such as trisglycidyl isocyanurate and the reaction product of glycidol with an isocyanate functional isocyanurate such as the trimmer of isophorone diisocyanate (IPDI).

Illustrative examples of isocyanate functional crosslinking agents (b) are all known isocyanate functional polymers and oligomers. Preferred isocyanate functional crosslinking agents are isocyanato ethylacrylate polymers and the trimers of diisocyanates such as IPDI and hexamethylene diisocyanate (HDI).

When functional groups (ii) are carboxyl, functional groups (iii) will most preferably be epoxy as described above.

When functional groups (ii) of reactive component (a) are carbamate, functional groups (iii) of crossliking agent (b)

may be selected from the group consisting of aminoplast resins, aldehydes, and mixtures thereof. Most preferably, when functional groups (ii) are carbamate, functional groups (iii) of crosslinking agent (b) will be aminoplast functional groups.

Illustrative examples of suitable aminoplast resins are melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), and carbamate formaldehyde resins.

When functional groups (ii) are epoxy, functional groups (iii) may be carboxyl or hydroxyl, or mixtures thereof, carboxyl being most preferred.

Illustrative examples of carboxyl functional crosslinking agents (b) are acid functional acrylics, acid functional polyesters, acid functional polyurethanes, and the reaction products of polyols such as trimethylol propane with cyclic anhydrides such as hexahydrophthalic anhydride. Such materials are known in the art.

When functional groups (ii) are cyclic carbonate, functional groups (iii) should be amine.

An illustrative example of an amine functional crosslinking agent (b) is triaminononane.

Similarly, when functional groups (ii) are amine, functional groups (iii) should be cyclic carbonate, isocyanate functional as described above, or mixtures thereof.

Cyclic carbonate functional crosslinking agents (b) may be obtained by the reaction product of carbon dioxide with any of the above described epoxy functional crosslinking agents (b). Alternatively, a cyclic carbonate functional monomer may be obtained by the reaction of carbon dioxide with an epoxy functional monomer such as glycidyl methacrylate or glycidol, followed by polymerization/oligomerization of the cyclic carbonate functional monomer. Additional methods of obtaining cyclic carbonate functional crosslinking agents are known in the art and may be used.

When functional groups (ii) are isocyanate, functional groups (iii) may be hydroxy, amine or mixtures thereof, hydroxy being most preferred.

Hydroxy functional crosslinking agents (b) are polyols, hydroxy functional acrylics, hydroxy functional polyesters, hydroxy functional polyurethanes, hydroxy functional isocyanurates and mixtures thereof as are known in the art.

Generally, reactive component (a) will be used in amounts of from 1 to 90%, preferably from 2 to 50%, more preferably from 2 to 25%, and most preferably from 2 to 10%, all based on the total fixed vehicle of the coating composition, i.e., the % NV of components (a), (b), (c), and (d).

Crosslinking agent (b) will be used in amounts of from 1 to 90%, preferably from 3 to 75%, and more preferably from 25 to 50%, all based on the total fixed vehicle of the coating composition, i.e., the % NV of components (a), (b), (c), and (d).

In addition to reactive component (a) and crosslinking agent (b), coating compositions of the invention may further comprise optional but preferred components (c) and (d). One or more polyfunctional polymeric compounds (c) will be different from (a) and may comprise one or more hydrogen reactive functional groups (iv). One or more crosslinking agent (d) will comprise a plurality of functional groups (v) which are reactive with the functional groups (iv) of compound (c). Crosslinking agent (d) may be the same or different relative to crosslinking agent (b).

The functional groups (iv) and (v) of compound (c) and crosslinking agent (d) need not, but may, form a thermally irreversible chemical link. In some instances (c) and (d) may be mixtures that result in a mixture of thermally reversible and irreversible chemical bonds. Generally, it is most preferred that at least some irreversible bonds be formed in the reaction between compound (c) and crosslinking agent (d).

One or more polyfunctional polymeric compounds (c) may be polymeric or oligomeric and will generally comprise a number average molecular weight of from 900 to 1,000,000, more preferably from 900 to 10,000. Compound (c) will generally have an equivalent weight of from 114 to 2000, and more preferably 250 to 750.

Polyfunctional polymeric compound (c) may be present in the coating composition in amounts of from 0 to 90%, preferably from 1 to 70%, and most preferably from 5 to 40%, all based on the fixed vehicle solids of the coating composition, i.e., % NV of components (a), (b), (c), and (d).

One or more polyfunctional polymeric compounds (c) will comprise one or more active hydrogen groups. "Active hydrogen group" as used herein refers to functional groups which donate a hydrogen group during the reaction with the functional groups of compounds (a). Examples of active hydrogen groups are carbamate groups, hydroxyl groups, amino groups, thiol groups, acid groups, hydrazine groups, activated methylene groups, and the like. Preferred active hydrogen groups are carbamate groups, hydroxyl groups, and mixtures thereof.

Such active hydrogen group containing polymer resins include, for example, acrylic polymers, modified acrylic polymers, polyesters, polyepoxides, polycarbonates, polyurethanes, polyamides, polyimides, and polysiloxanes, all of which are well-known in the art. Preferably, the polymer is an acrylic, modified acrylic, polyester or polyurethane. More preferably, the polymer is an acrylic or polyurethane polymer.

In one preferred embodiment of the invention, the polymer is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as the polymer (A) according to the invention. Such acrylics may be polyester-modified acrylics or polyurethane-modified acrylics, as is well-known in the art. Polyester-modified acrylics modified with α-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Preferred carbamate functional compounds (c) used in the composition of the invention can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing compound (c) used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (c) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

The polymer (c) will generally have a molecular weight of 2000–20,000, and preferably from 3000–6000. As used herein, molecular weight means number average molecular weight, and can be determined by the GPC method using a polystyrene standard. The carbamate content of the polymer, on a molecular weight per equivalent of carbamate functionality, will generally be between 200 and 1500, and preferably between 300 and 500. The glass transition temperature, $T_g$, of components (A) and (B) can be adjusted to achieve a cured coating having the $T_g$ for the particular application involved.

The polymer component (c) can be represented by the randomly repeating units according to the following formula:

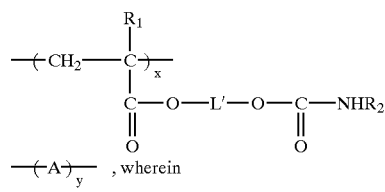
, wherein

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of I to 8 carbon atoms, cycloaliphatic, or aromatic linking group of 6 to 10 carbon atoms. Examples of L include

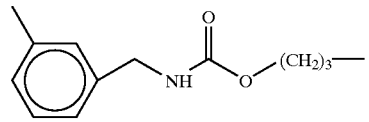

—$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

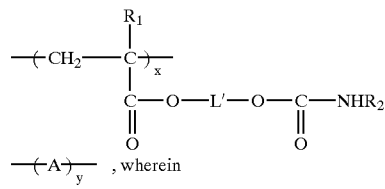
, wherein

In this formula, $R_1$, $R_2$, A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

A most preferred carbamate and hydroxyl functional polymer (c) can be described as follows.

The most preferred carbamate functional polymer (c) will have a number average molecular weight of from 1000 to 5000, a carbamate equivalent weight of from 300 to 600, and a Tg of from 0 to 150° C. A most preferred carbamate-functional polymer (c) will have a number average molecular weight of from 1500 to 3000, a carbamate equivalent weight of from 350 to 500, and a Tg of from 25 to 100° C.

This carbamate functional polymer (c) will have from at least 66 to 100% by weight, based on the total weight of the polymer, of one or more repeat units A selected from the group consisting of

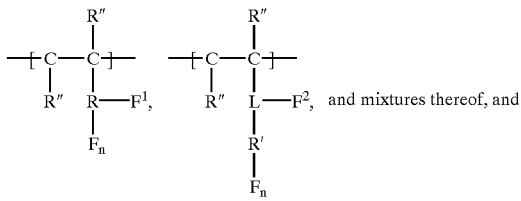

and mixtures thereof, and from 0 to less than 35% by weight, based on the total weight of the polymer, of one or more repeat units A' having the structure

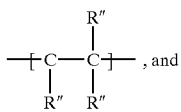

, and

More preferably, this most preferred carbamate functional polymer (c) will have from 80 to 100 weight percent of one or more repeat units A and from 20 to 0 weight percent of one or more repeat units A', and most preferably, from 90 to 100 weight percent of one or more repeat units A and from 10 to 0 weight percent of one or more repeat units A', based on the total weight of the final carbamate functional polymer. A particularly preferred carbamate functional polymer of the invention will have more than 90 weight percent of one or more repeat units A and less than 10 weight percent, preferably between 1 and 9 weight percent, of one or more repeat units A', based on the total weight of the carbamate functional polymer of the invention.

In the above, R is an at least divalent nonfunctional linking group having from I to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable R groups are aliphatic or cycloaliphatic linking groups of from 1 to 60 carbons, aromatic linking groups of from 1 to 10 carbons, and mixtures thereof. Preferred R groups include aliphatic or cycloaliphatic groups of from 2 to 10 carbons. R may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

Examples of particularly preferred R groups are set forth below. Note that $F^1$ is not part of R but is shown in the structures below to provide perspective.

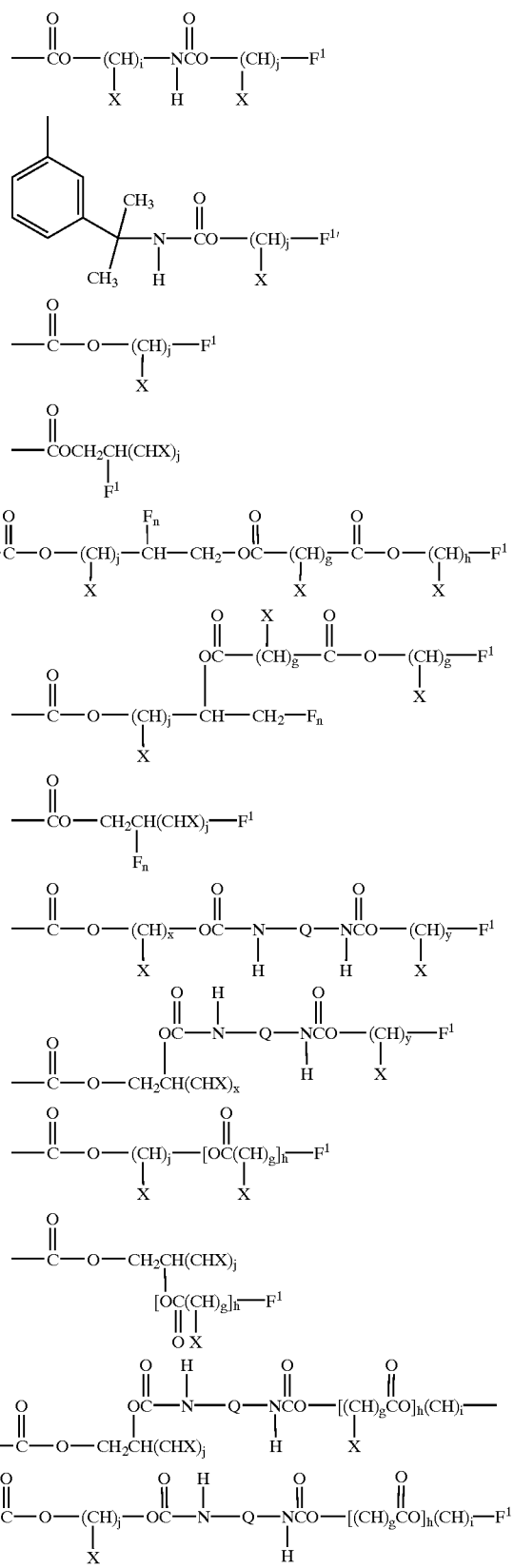

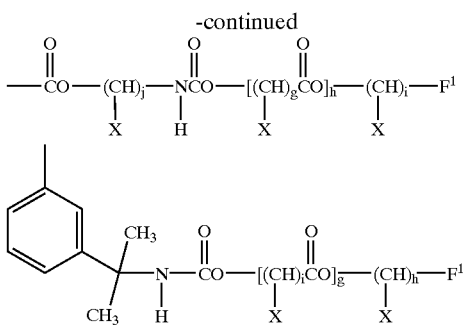

and isomers thereof, wherein X is H or is a a monovalent nonfunctional linking group having from 1 to 20 carbon atoms and from 0 to 20 heteroatoms selected from the group consisting of oxygen, nitrogen, sulfur, phosphorus, and silane, and mixtures thereof; i, j, g, and h are intergers from 0 to 8; and Q is an at least divalent nonfunctional linking group having from 1 to 60 carbon atoms and from 0 to 20 heteroatoms selected from the group consisting of oxygen, nitrogen, sulfur, phosphorus, and silane, and mixtures thereof.

A most preferred R group is

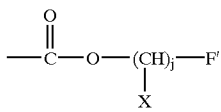

wherein j is from 1 to 6 and X is as defined above.

R' is an at least monovalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable R' groups are aliphatic or cycloaliphatic linking groups of from 1 to 60 carbons, aromatic linking groups of from 1 to 10 carbons, and mixtures thereof. Preferred R' groups include aliphatic or cycloaliphatic groups of from 2 to 10 carbons. R' may, and preferably will, include one or more heteroatoms via one or more divalent internal linking groups such as esters, amides, secondary carbamates, ethers, secondary ureas, ketones, and mixtures thereof. The use of esters as internal linking groups is most preferred.

Examples of particularly preferred R' groups are

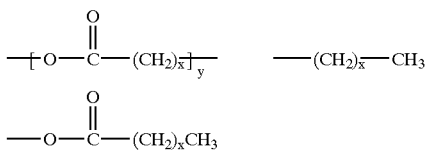

wherein x and y are from 0 to 10, preferably from 3 to 8.

In a preferred embodiment, the at least monovalent nonfunctional linking group R' will comprise at least one branched alkyl group of from 5 to 20 carbons, preferably from 5 to 15 carbons and most preferably from 8 to 12 carbons. An example of an especially suitable structure for incorporation into linking group R' is

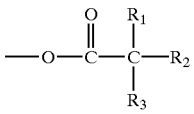

wherein $R_1$, $R_2$, and $R_3$ are alkyl groups of from 1 to 10 carbons each. Most preferably, $R_1$, $R_2$, and $R_3$ will total from 8 to 12 carbons with at least one of RI, $R_2$, and $R_3$ being a methyl group. In a most preferred embodiment, n will be 0 when R' comprises this branched alkyl structure.

R" is H or a monovalent nonfunctional linking group having from 1 to 20 carbon atoms and from 0 to 20 heteroatoms selected from the group consisting of oxygen, nitrogen, sulfur, phosphorus, and silane, and mixtures thereof.

Illustrative examples of suitable R" groups are hydrogen, aliphatic or cycloaliphatic linking groups of from 1 to 60 carbons, aromatic linking groups of from 1 to 10 carbons, and mixtures thereof. R" may, and preferably will, include one or more heteroatoms via one or more divalent internal linking groups such as esters, amides, secondary carbamates, ethers, secondary ureas, ketones, and mixtures thereof.

Preferred R" groups are H, —$CH_3$, aromatic groups such as benzyl, and alkyl esters of from 2 to 10 carbons, especially from 4 to 8 carbons. H and methyl are most preferred as R".

L is an at least trivalent nonfunctional linking group having from 1 to 60 carbon atoms and from 0 to 20 heteroatoms selected from the group consisting of oxygen, nitrogen, sulfur, phosphorus, and silane, and mixtures thereof As used here, "nonfunctional" refers to the absence of groups which are reactive with crosslinking agents under traditional coating curing conditions.

Illustrative examples of suitable L groups are aliphatic or cycloaliphatic linking groups of from 1 to 60 carbons, aromatic linking groups of from 1 to 10 carbons, and mixtures thereof. Preferred L groups include aliphatic or cycloaliphatic groups of from 2 to 10 carbons. L may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

An example of preferred L groups are

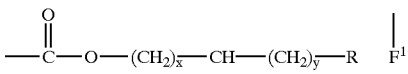

and isomers thereof, wherein $F^1$ and R are as described, x and y may the same or different and are from 0 to 10, preferably from 1 to 3, and is most preferably 1.

F, $F^1$ and $F^2$ are functional groups selected from the group consisting of primary carbamate groups, hydroxyl groups, and mixtures thereof, such as beta-hydroxy primary carbamate groups, with the proviso that at least one of $F^1$ and $F^2$ are a primary carbamate group or a beta-hydroxy primary carbamate group, and n is an integer from 0 to 3, most preferably 0.

Polyesters having active hydrogen groups such as hydroxyl groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Carbamate functional polyesters for use as polymeric compound (c) may be prepared as follows.

Suitable polyesters can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated Bisphenol A, cyclohexanediol, cyclohexanedimethanol, caprolactone-based diols such as the reaction product of e-caprolactone and ethylene glycol, hydroxyalkylated bisphenols, polyether glycols such as poly (oxytetramethylene)glycol, and the like. Although the polyol component can comprise all diols, polyols of higher functionality can also be used. It is preferred that the polyol be a mixture of at least one diol; and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is less than 3.3/1, preferably up to 1.4/1.

Carbamate groups can be incorporated into the polyester by first forming a hydroxyalkyl carbamate that can be reacted with the polyacids and polyols used in forming the polyester. A polyester oligomer can be prepared by reacting a polycarboxylic acid such as those mentioned above with a hydroxyalkyl carbamate. An example of a hydroxyalkyl carbamate is the reaction product of ammonia and propylene carbonate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid with a hydroxy functional polyester. Also, carbamate functionality can be incorporated into the polyester by reacting a hydroxy functional polyester with urea.

Carbamate groups can be incorporated into the polyester by a transcarbamalation reaction. In this reaction, a low molecular weight carbamate functional material derived from a low molecular weight alcohol or glycol ether such as methyl carbamate is reacted with the hydroxyl groups of a hydroxyl functional polyester, yielding a carbamate functional polyester and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Besides carbamate functionality the polyester polymers and oligomers may contain other functional groups such as hydroxyl, carboxylic acid and/or anhydride groups. The equivalent weight of the polyesters containing terminal carbamate groups will be from about 140 to 2500, based on equivalents of carbamate groups. The equivalent weight is a calculated value based on the relative amounts of the various ingredients used in making the polyester, and is based on the solids of the material.

Illustrative carbamate functional polyesters suitable for use as polyfunctional polymeric compound (c) typically have weight average molecular weights of about 1000 to 30,000, preferably 1000 to 10,000 as determined by gel permeation chromatography using polystyrene as a standard.

Polyurethanes having active hydrogen functional groups suitable for use as polyfunctional polymeric compound (c) are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Carbamate functional polyurethanes may be prepared by reacting the active hydrogen groups with a low molecular weight carbamate functional material derived from a low molecular weight alcohol or glycol ether such as methyl.

Other carbamate functional compounds preferred for use as polyfunctional polymeric compound (c) are carbamate-functional compounds which are the reaction product of a mixture comprising a polyisocyanate or a chain extended polymer, and a compound comprising a group that is reactive with isocyanate or a functional group on the chain extended polymer as well as a carbamate group or group that can be converted to carbamate. Such compounds are described in U.S. Pat. Nos. 5,373,069 and 5,512,639 hereby incorporated by reference.

For example, suitable polyisocyanates can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and paraxylylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of α', α', α', α'-tetramethyl xylylene diisocyanate can be used. Also useful as the polyisocyanate are isocyanurates such as DESMODUR® 3300 from Mobay and biurets of isocyanates such as DESMODUR® NIOO from Mobay.

Active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. Both primary and secondary amine groups are considered as having one active hydrogen. Active hydrogen-containing chain extension agents also include water. In a preferred embodiment of the invention, a polyol is used as the chain extension agent, to provide a polyurethane. In an especially preferred embodiment, a diol is used as the chain extension agent with little or no higher polyols, so as to minimize branching. Examples of preferred diols which are used as polyurethane chain extenders include 1,6 hexanediol, cyclohexanedimethylol, and 1,4-butanediol. While polyhydroxy compounds containing at least three hydroxyl groups may be used as chain extenders, the use of these compounds produces branched polyurethane resins. These higher functional polyhydroxy compounds include, for example, trimethylolpropane, trimethylolethane, pentaerythritol, among other compounds.

The polymer may be chain extended in any manner using these compounds having at least two active hydrogen groups. Thus, these compounds may be added to a mixture of polyisocyanate, polyol, and multi-functional compound, or alternatively, may react at an intermediate stage, to link two free isocyanate groups that are present at the terminal ends of an intermediate polymer.

Polymeric chain extension agents can also be used, such as polyester polyols, polyether polyols, polyurethane polyols, or polymeric amino group-containing polymers, as is known in the art. Mixtures of any of the above chain extension agents can also be used.

The reaction of the polyisocyanate and polyol is conducted by heating the components in a suitable reaction medium such as xylene or propylene glycol monoethylether acetate. The use of catalysts for this reaction, e.g., organotin catalysts such as dibutyltin diacetate, is well-known in the art. The degree of polymerization is controlled by the duration of the maintenance of the elevated temperature reaction conditions. Various groups, such as nonionic polyether stabilizing groups, ionic stabilizing groups (e.g., carboxyl groups), unsaturated bond groups, and the like may be incorporated or appended to the polymer, as is known in the art.

The polyisocyanate or chain extended polyisocyanate polymer used in the practice of the present invention contains one or more functional groups for reaction with the compound containing a carbamate group or a group convertible to carbamate. Examples of these groups include isocyanate groups, hydroxyl groups, epoxy groups, unsaturated double bonds, carboxylic acid groups, and ketals. In a preferred embodiment, the functional group on the polymer (A)(1) is a terminal isocyanate group. The presence of isocyanate active hydrogen terminal groups (e.g., hydroxyl) may be controlled by the molar ratio of active hydrogen:NCO in the reaction mixture. A ratio of greater than 1 will tend to provide active hydrogen-terminated polymers. A ratio of less than 1 will tend to provide isocyanate-terminated polymers.

The functional groups on the polymer to be reacted with the compound containing either carbamate groups or groups convertible to carbamate may be terminal groups or they may be pendant groups. Active hydrogen or isocyanate terminal groups may be provided by adjusting the stoichiometry of the chain extension agent and polyisocyanate in the reaction mixture. Other terminal groups may be provided by the use of capping agents. For example, an acid terminal group can be provided by capping the polymer with a hydroxyacid. Pendant functional groups may be provided by using chain extension agents having two active hydrogen groups and the desired functional group, e.g., dimethanol propionic acid, as is well-known in the art.

The carbamate or carbamate convertible group containing compound has a group that is reactive with the functional group on the polyisocyanate or chain extended polymer, and also has either a carbamate group or a group that is capable of forming a carbamate group. Groups that are capable of forming a carbamate group include cyclic carbonate groups, epoxide groups, and unsaturated double bond groups. Cyclic carbonate groups can be converted to carbamate groups by reaction with ammonia. Epoxide groups can be converted to carbamate by reaction with $CO_2$ and then ammonia. Unsaturated double bond groups can be converted to carbamate by reaction with peroxide, then $CO_2$ and ammonia.

The particular functional groups on the carbamate or carbamate convertible group containing compound depends on the specific functional group on the polymer with which the reaction is to take place. If the polymer's functional group is an isocyanate group, the group on the carbamate or carbamate convertible group containing compound is preferably an active hydrogen-containing group such as hydroxyl or amino. For example, an isocyanate group on the polymer can be reacted with a hydroxyalkyl carbamate, or with a hydroxy-containing epoxide with the epoxy group subsequently converted to carbamate by reaction with $CO_2$ and then ammonia. If the polymer's functional group is hydroxyl, the reactive group on the carbamate or carbamate convertible group containing compound may be oxygen of the COO portion of the carbamate group on an alkyl carbamate or methylol, such as with methylol acrylamide ($HO-CH_2-NH-CO-CHCH_2$). In the case of the COO group on an alkyl carbamate, the hydroxyl group on the polymer undergoes a transesterification with the COO group, resulting in the carbamate group being appended to the polymer. In the case of methylol acrylamide, the unsaturated double bond is then reacted with peroxide, $CO_2$, and ammonia as described above. If the functional group on the polymer is a carboxyl group, the acid group can be reacted with epichlorohydrin to form a monoglycidyl ester, which can be converted to carbamate by reaction with $CO_2$, and then ammonia. Alternatively, an acid-functional group on the polymer can be reacted with acetic anhydride to generate an anhydride, which can then be reacted with a compound having an active hydrogen group such as hydroxyl and a carbamate group or group that can be converted to carbamate.

In a preferred embodiment, polyfunctional polymeric compound (c) will be obtained with the use of a carbamate or carbamate convertible group containing compound which contains a group that is reactive with NCO and a group that can be converted to carbamate. Examples of these compounds include active hydrogen-containing cyclic carbonate compounds (e.g., the reaction product of glycidol and $CO_2$) that are convertible to carbamate by reaction with ammonia, monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia. Any of the above compounds can be utilized as compounds containing carbamate groups rather than groups convertible to carbamate by converting the group to carbamate prior to reaction with the polymer.

In another preferred embodiment, the polyfunctional polymeric compound (c) will be obtained with the use of a carbamate or carbamate convertible group containing compound which contains a carbamate group and a group that is reactive with NCO. Examples of compounds containing a carbamate group and a group that is reactive with NCO include hydroxyethyl carbamate and hydroxypropyl carbamate.

Finally, the polymeric polyfunctional compound (c) may be a water dispersible resin having an active hydrogen containing group as described above.

The coating compositions of the invention may also comprise a curing agent or crosslinking agent (d) that is at least reactive with the functional groups (iv) of polyfunctional polymeric compound (c). Crosslinking agent (d) may also be reactive with the functional groups (ii) of reactive compound (a) but it is not required. Crosslinking agents (b) and (d) may be the same or different.

Crosslinking agent (d) may be present in the coating composition in amounts of from 0 to 90%, preferably from 0 to 70%, and most preferably from 1 to 25%, all based on the fixed vehicle solids of the coating composition, i.e., % NV of components (a), (b), (c), and (d).

Suitable curing agents (d) will have, on average, at least about two functional groups (v) reactive with the functional groups (iv) of polyfunctional polymeric compound (c). The functional groups (v) of the crosslinking agent (d) may be of more than one kind.

Useful curing agents (d) include all of those described above for crosslinking agent (b) as well as materials having active methylol or methylalkoxy groups, such as aminoplast crosslinking agents or phenol/formaldehyde adducts; curing agents that have isocyanate groups, particularly blocked isocyanate curing agents, curing agents that have epoxide groups, amine groups, acid groups, siloxane groups, cyclic carbonate groups, and anhydride groups; and mixtures thereof. Examples of preferred crosslinking agents (d) include, without limitation, melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurates of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Another suitable crosslinking agent is tris(alkoxy carbonylamino) triazine (available from Cytec Industries under the tradename TACT). The curing agent may be combinations of these, particularly combinations that include aminoplast crosslinking agents. Aminoplast resins such as melamine formaldehyde resins or urea formaldehyde resins are especially preferred. Combinations of tris(alkoxy carbonylamino) triazine with a melamine formaldehyde resin and/or a blocked isocyanate curing agent are likewise suitable and desirable.

A solvent may optionally be utilized in the coating compositions of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

The coating composition used in the practice of the invention may include a catalyst to enhance the cure reactions between reactive component (a), crosslinking agent (b), polyfunctional polymeric compound (c), and/or crosslinking agent (d). For example, when aminoplast compounds, especially monomeric melamines, are used as crosslinking agents (b) or (d), a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

Additional agents, for example surfactants, fillers, stabilizers, wetting agents, dispersing agents, adhesion promoters, UV absorbers, hindered amine light stabilizers, etc. may be incorporated into the coating compositions of the invention. While such additives are well-known in the prior art, the amount used must be controlled to avoid adversely affecting the coating characteristics.

Coating compositions according to the invention may be used as primers, especially weatherable primers, basecoats, topcoats, and/or clearcoats. They are particularly suitable for use in coating compositions used in composite color-plus-clear coating systems and the like, and may be one component or two component. In a particularly preferred embodiment, coating compositions according to the invention are preferably utilized in high-gloss coatings and/or as clearcoats of composite color-plus-clear coatings. High-gloss coatings may be described as coatings having a 20° gloss or more(ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

Coating compositions can be coated on desired articles by any of a number of techniques well known in the art. These include, for example, spray coating, dip coating, roll coating, curtain coating, and the like. For automotive body panels, spray coating is preferred.

The coating compositions of the invention may be applied may be applied to a wide variety of substrates, especially those typically encountered in the transportation/automotive industries. Illustrative examples include metal substrates such as steel, alumimun, and various alloys, flexible plastics, rigid plastics and plastic composites.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 90° C. and 180° C. The first compounds according to the present invention are preferably reactive even at relatively low cure temperatures. Thus, in a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

EXAMPLES

Example I

Preparation of a Reactive Component (a)—Part 1

A mixture of 59.4 parts of Pripol™ saturated fatty acid dimer diol, (commercially available from Uniqena), 20.1 parts methyl carbamate, 20.4 parts toluene and 0.09 parts of dibutyl tin oxide are heated to reflux. Once at reflux, the methanol is removed from the reaction mixture and the toluene is allowed to return to the reaction mixture. After 96% of the hydroxy groups are converted to primary carbamate groups, the excess methyl carbamate and toluene are removed by vacuum distillation. A dicarbamate functional reactive component (a) was obtained.

Preparation of a Reactive Component (a)—Part 2

A mixture of 53.5 parts of L98-212 al blend of dimer and trimer fatty acid polyols, (available from Uniqena), 19.1 parts methyl carbamate, 27.2 parts toluene, and 0.17 parts of dibutyl tin oxide are heated to reflux. Once at reflux, the methanol is removed from the reaction mixture and the toluene is allowed to return to the reaction mixture. After 98% of the hydroxy groups are converted to primary carbamate groups, the excess methyl carbamate and toluene are removed by vacuum distillation. A mixture of dicarbamate and tricarbamate functional reactive components (a) was obtained.

Example II

Flexible Two Component Clearcoats According to the Invention

The effect of the addition of reactive component (a) and crosslinking agent (b) to a two-component hydroxy/isocyanate based clearcoat was evaluated. Clearcoats were made as follows:

TABLE 1

|  | Control A | Clearcoat B | Clearcoat C | Clearcoat D |
|---|---|---|---|---|
| Resin[1] | 65.68 | 57.6 | 51.28 | 57.6 |
| Diol[2] | 0 | 4.49 | 8.00 | 0 |
| Diol/Triol mixture[3] | 0 | 0 | 0 | 4.49 |
| Fumed Silica[4] | 7.95 | 6.97 | 6.21 | 6.97 |
| Surface Modifier[5] | 0.45 | 0.39 | 0.35 | 0.39 |
| UVA[6] | 2.23 | 1.96 | 1.74 | 1.96 |
| HAL[7] | 0.73 | 0.64 | 0.57 | 0.64 |
| HDI[8] | 13.77 | 12.08 | 10.75 | 12.08 |
| IPDI[9] | 9.19 | 15.87 | 21.09 | 15.87 |

[1]A 74% NV acrylic resin in Solvess 100 (Midland) that has a Tg of 0° C., OH equ. wt of 352 g/equ and acid eq. wt of 2250 g/equ.
[2]A fatty acid dimer diol (Pripol 2033 ® from Uniqema, Wilmington, DE).
[3]L98-212, a fatty acid dimer and trimer blend from Uniqema having an equivalent weight of 259 g/equ.
[4]A 40% Nv fumed silica dispersion.
[5]A 10% NV of BYK331 ® from Byk Chemie.
[6]Tinuvin1130 ® from Byk Chemie.
[7]Tinuvin123 ® from Byk Chemie.
[8]The isocyanurate of hexamethylene diisocyanate.
[9]The isocyanurate of isophorone diisocyanate.

The resulting clearcoats were first reduced to spray viscosity using a mixture of odorless mineral spirits, diisobutyl ketone, butyl acetate, butyl carbitol acetate (Union Carbide), ethylene glycol butyl ether acetate, and methyl propyl ketone. They were then sprayed over an uncured solvent born black acrylic/melamine based basecoat and cured for 30 minutes at 250° F.

The resulting panels were exposed during the summer for 14 weeks to the environment. The degree of etch damage was then rated on a 1 to 10 scale, where: 0 to 3 indicates that the etch would be very slight and only noticed by a trained observer; 4 to 6 indicates that the etch would be slight to moderate; 7 to 10 indicates etch severe enough to be observed by untrained observers.

Room temperature flexibility test was evaluated per GM test method GM9503P, entitled "Evaluating Brittleness of painted plastics and sealants by means of a mandrel". Flexibility was rated on a 1 to 10 scale, where a rating of "10" means no cracks were formed; "9", interrupted short line cracks; "8" a maximum of 4 uninterrupted line cracks in the paint; on down to "0". The flex test was run before and after the panels were sent out for etch exposure.

As indicated by the results below in Table 2, in all instances the addition of reactive component (a) and crosslinking agent (b) improved both etch and flexability.

Example III

High Solids Carbamate Functional Clearcoats According to the Invention

High solids carbamate functional clearcoats E, F, G, H, I, J, K, and L were formulated per Table 3 below. The carbamate functional acrylic resin was combined with the reactive component (a) in an appropriate container equipped with an air mixer. The aminoplast, and in some cases blocked polyisocyanate, were then added. The UV Absorber, hindered amine light stabilizer, flow additives, and acid catalyst were added under agitation. The samples were reduced to a spray viscosity of 35 seconds on a #4 Ford Viscosity Cup at 80° F. and the weight non-volatiles determined according to ASTM D2369 (1 Hour @ 110° C.)

TABLE 3

| Raw Material | E | F | G | H | I | J | K | L |
|---|---|---|---|---|---|---|---|---|
| Resin[1] | 336.57 | 300.48 | 166.07 | 314.40 | 248.78 | 152.98 | 155.05 | 246.76 |
| Aminoplast[2] | 43.64 | 45.50 | 46.77 | — | — | — | — | — |
| UVA[3] | 10.59 | 10.59 | 10.59 | 10.59 | 10.59 | 10.59 | 10.59 | 10.59 |
| HALS[4] | 9.00 | 9.00 | 9.00 | 4.50 | 4.50 | 4.50 | 4.50 | 4.50 |
| SCA[5] | 1.50 | 1.50 | 1.50 | 0.75 | 0.75 | 0.75 | 0.75 | 0.75 |
| Wetting Agent | 0.75 | 0.75 | 0.75 | — | — | — | — | — |
| DDBSA[7] | 14.40 | 14.40 | 14.40 | 14.40 | 14.40 | 14.40 | 14.40 | 14.40 |
| Solvent[8] | 21.00 | 21.00 | 21.00 | 21.00 | 21.00 | 21.00 | 21.00 | 21.00 |
| Solvent[9] | 118.77 | 128.58 | 167.56 | 151.89 | 136.39 | 130.48 | 130.54 | 134.23 |
| Reactive Comp (a)[10] | — | 23.70 | — | — | — | — | — | 41.97 |
| Reactive Comp (a)[11] | — | — | 117.91 | — | — | — | 105.48 | — |
| Aminoplast[12] | — | — | — | 87.32 | 91.11 | 96.64 | 92.07 | 93.89 |
| Isocyanate[13] | — | — | — | 20.00 | 20.00 | 20.00 | 20.00 | 20.00 |
| Wetting Agent[14] | — | — | — | 0.15 | 0.15 | 0.15 | 0.15 | 0.15 |
| Reactive Comp (a)[15] | — | — | — | — | 42.31 | 104.07 | — | — |

[1]Carbamate functional resin prepared according to U.S. Ser. No. 60,157,166.
[2]Resimene ® 747, Monomeric melamine from Solutia.
[3]Tinuvin ® 400, Triazine UV absorber from Ciba-Geigy.
[4]Sanduvar ™ 3058, hindered amine light stabilizer from Clariant.
[5]Surface control agent, Disparlon ™ from Kusumoto Chemicals.
[6]Wetting Agent, Disparlon ™ from Kusumoto Chemicals.
[7]Nacure 5543, blocked DDBSA acid catalyst from King Ind.
[8]Exxate 1000, C10 Alkyl Solvent from Exxon.
[9]Exxate 600, C6 Alkyl Acetate Solvent from Exxon.
[10]Pripol ™ 2033, C36 Dimer diol from Uniqema.
[11]Reactive Component (a) from Example I, Part 2.
[12]Resimene ® BM-9539, Butylated polymeric melamine from Solutia.
[13]Desmodur ® TP LS 2253, Dimethyl Pyrazale blocked hexamethylene diisocyanate adduct from Bayer.
[14]Silwet ™ wetting agent from Witco.
[15]Reactive Component (a) from Example I, Part 1.

TABLE 2

| | Control A | Clearcoat B | Clearcoat C | Clearcoat D |
|---|---|---|---|---|
| 14 week etch rating[10] | 9 | 7 | 5 | 6 |
| RT Flex before exposure[11] | 10 | 10 | 10 | 10 |
| RT Flex after exposure[11] | 9 | 10 | 10 | 10 |

Panel preparation for 140 QTC: Clearcoat samples E–L were applied via air-atomized spray gun wet-on-wet over a conventional black waterborne basecoat (BWBC) which was sprayed over 4×12 inch electrocoated steel panels. Clearcoats H–L were also applied in a similar manner over a conventional solvent borne medium solids black basecoat (MS). The basecoats are respectively available from BASF Corporation of Southfield, Mich. as E202KW706 and FD80-9103-0101(VWL041). The waterborne basecoat was flashed for 5 minutes at 140° F. before the clearcoat was applied. The basecoat film thickness was 7 mil (18 microns) and the clearcoat film builds were 1.8–2.0 mil (46–51 microns).

After application the panels were allowed to flash at ambient temperature for 10 minutes and then baked in a gas fired convection oven for 20 minutes at 275° F. (129° C.) metal temperature.

Cleveland Condensing Humidity (140 QTC): Panels for Cleveland Condensing Humidity were subjected to 140° F. temperature and 100% relative humidity for 24 hours in a standard QCT cabinet. Immediately after being pulled from the cabinet they were evaluated for blanching or whitening and any sign of blistering. The scale was 1–5 with 1 being best. The panels were again evaluated after a four-hour recovery to let any water escape the film.

Cold Thick Film Gravelometer (CTFG):The above panel preparation procedure for QTC panels was generally followed except that three additional repair coats of base/clear were applied to each 4×12 inch panel with the same 20×275° F. bake for each coat (no sanding) giving a final total film build of about 11 mil. The panels were conditioned for 4 hours in a −20° F. freezer gravelometer room prior to testing. A standard gravelometer was used to fire 1 pint of cold gravel at 70 PSI at each panel. They were then allowed to return to room temperature, washed off, taped to remove any loose paint, and evaluated against standard charts for amount of damage on a scale of from 1–10, 10 being the best.

TABLE 4

| Clearcoat Sample | % Nonvolatile | 140 QTC Initial | 140 QTC Recovered | CTFG |
|---|---|---|---|---|
| Control E | 54.0 | 2 | 2 | 0c |
| F | 56.0 | 2 | 2 | 6 |
| G | 58.0 | 1 | 1 | 6 |

TABLE 5

| Clearcoat Sample | % NV | 140 QCT WBBC Initial | 140 QCT WBBC Recovered | 140 QCT MS Initial | 140 QCT MS Recovered | CTFG WBBC | CTFG MS |
|---|---|---|---|---|---|---|---|
| Control H | 48.0 | 2.0 | 2.0 | 2.0 | 2.0 | 3 | 4 |
| I | 50.9 | 2.0 | 1.5 | 2.0 | 1.0 | 5 | 4 |
| J | 54.0 | 1.0 | 1.0 | 2.0 | 1.0 | 6 | 6 |
| K | 54.1 | 1.0 | 1.0 | 1.0 | 1.0 | 5 | 5 |
| L | 51.0 | 2.0 | 1.0 | 1.0 | 1.0 | 6 | 6 |

It can be seen from Tables 4 & 5 that in all cases, coating compositions according to the invention provide improvements in % NV, Cleveland Condensing Humidity (weathering/humidity) and/or Cold Thick Film Gravelometer evaluations (chip resistance).

Example IV

Flexible one component clearcoats were prepared according to Table 6 below. In clearcoats M and P, the raw materials were added under agitation in order. For clearcoats N, O, Q and R, the raw materials were batch loaded and then placed under agitation.

TABLE 6

| Raw Materials | M | N | O | P | Q | R |
|---|---|---|---|---|---|---|
| Reactive Comp (a)[16] | 44.74 | 13.55 | 20.74 | 45.96 | — | — |
| Aminoplast[17] | 15.25 | 22.94 | 23.53 | 14.03 | 22.22 | 22.45 |
| Catalyst[18] | 3.95 | 2.37 | 1.58 | 3.94 | 3.94 | 3.94 |
| HALS | 12.77 | 1.90 | 1.90 | 12.77 | 1.90 | 1.90 |
| Polybutyl acrylate | 0.11 | — | — | 0.11 | — | — |
| Fumed silica | 6.43 | 5.48 | 5.50 | 6.42 | 5.48 | 5.48 |
| Isobutyl alcohol | 4.62 | — | — | 4.61 | — | — |
| Butyl cellosolve acetate | 11.99 | — | 15.98 | 12.13 | — | 15.37 |
| Carbamate functional resin[19] | — | 47.69 | 22.44 | — | 48.89 | 23.32 |
| Siloxane | — | 0.43 | 0.44 | — | 0.44 | 0.44 |
| Butanol | — | 7.90 | 7.90 | — | 7.90 | 7.90 |
| Reactive comp (a)[20] | — | — | — | — | 13.90 | 21.55 |

[16]Reactive Component (a) from Ex I, Part 1
[17]Resimene 747 from Solutia
[18]Amine salt of a sulfuric acid.
[19]Carbamate functional resin prepared per U.S. Pat. Nos. 5,373,069, and 5,512,639.
[20]Reactive component (a) from Ex I, Part 2.

The clearcoat compositions were evaluated for % nonvolatile, 14 week etch resistance and scratch & mar resistance.

All text panels were CA186AC black TPO (Montell) which had been acid washed followed a basic wash. Etch test panels had been primed with a solvent borne black flexible primer, commercially available from BASF Corporation as U04KM004A. All other test panels were treated with an adhesion promoter U04KM039C, commercially available from BASF Corporation. Clearcoats were spray applied wet on wet over solvent borne black acrylic/melamine based basecoat, commercially available from BASF Corporation as E98KM405. The basecoat was flashed 5 minutes at ambient. The resulting composite color plus clear compositions according to the invention were cured for 30 minutes at 265° F., while those using control clearcoats were cured 30 minutes at 250° F. Clearcoat film builds were 1.6 to 1.8 mils, basecoat film builds 0.6 to 0.9 mils.

The clearcoats according to the invention were evaluated against control clearcoats S, T, and U. Clearcoat S was a one component carbamate functional acrylic based flexible clearcoat, commercially available from BASF Corporation as E201CM001. Clearcoat T was a one component hydroxy functional acrylic based flexible clearcoat commercially available from BASF Corporation of Southfield, Mich. as E86CM200. Clearcoat U was a two component hydroxyl functional acrylic/isocyanate based flexible clearcoat commerically available from BASF Corporation of Southfield, Mich. as E42CM042.

% NV and 14 week etch were evaluated as indicated above. Scratch & mar was evaluated per BASF Corporation internal test method LP-463PB-54-01 wherein increasing % gloss retention is desired and visual appearance is evaluated on a scale of from 1 to 5, 1 being the best. The results are set forth below in Table 7.

TABLE 7

| Clearcoat Sample | % NV | 14 Week Etch | Scratch & Mar % gloss retention | visual |
|---|---|---|---|---|
| M | 59.5 | 9 | 95 | 1 |
| N | 51.9 | 4 | 94 | 3 |
| O | 61.1 | 4 | 98 | 2 |
| P | 56.5 | 5 | 99 | 1 |
| Q | 51.3 | 3 | 94 | 3 |
| R | 60.7 | 6 | 99 | 2 |
| Control S | 52.2 | 8 | 90 | 4 |
| Control T | — | 10B | 97 | 2 |
| Control U | — | 7 | 73 | 5 |

It can be seen that the coating compositions according to the invention provide improvements in % NV, etch and/or scratch & mar resistance.

What is claimed is:

1. A coating composition comprising
   (a) a reactive component which is substantially free of any heteroatoms and is not a crystalline solid at room temperature comprising
      (i) from 12 to 72 carbon atoms, and
      (ii) at least two functional groups, and comprises a mixture of two or more structures selected from the group consisting of aliphatic structures for reactive component (a), aromatic-containing structures for reactive component (a), cycloaliphatic-containing structures for reactive component (a), and mixtures thereof, wherein at least one of the two or more structures is either a cycloaliphatic-containing structure or an aromatic-containing structure, and
   (b) a crosslinking agent comprising a plurality of functional groups (iii) reactive with the functional groups (ii) of reactive compound (a),
wherein functional groups (ii) and (iii) are selected such that reaction between them produces a thermally irreversible chemical linkage.

2. The coating composition of claim 1 wherein reactive component (a) is a liquid or a waxy solid at temperatures of less than 20 degrees C.

3. The coating composition of claim 1 wherein reactive component (a) comprises at least one aliphatic-containing structure and a least one other structure selected from the group consisting of aromatic-containing structures, cycloaliphatic-containing structures, and mixtures thereof.

4. The coating composition of claim 3 wherein the at least one other compound is present as a mixture of aromatic containing compounds and cycloaliphatic containing compounds.

5. The coating composition of claim 3 wherein the at least one other compound is not a mixture of aromatic containing compounds and cycloaliphatic containing compounds.

6. The coating composition of claim 5 wherein the at least one other compound is present as a mixture of the isomers of either aromatic containing compounds or cycloaliphatic containing compounds.

7. The coating composition of claim 1 wherein the reactive component (a) comprises at least one aromatic-containing structure and at least one other structure selected from the group consisting of aliphatic-containing structures, cycloaliphatic-containing structures, and mixture thereof.

8. The coating composition of claim 7 wherein the at least one other compound is present as a mixture of aromatic containing compounds and cycloaliphatic containing compounds.

9. The coating composition of claim 7 wherein the at least one other compound is not a mixture of aromatic containing compounds and cycloaliphatic containing compounds.

10. The coating composition of claim 9 wherein the at least one other compound is present as a mixture of the isomers of either aromatic containing compounds or cycloaliphatic containing compounds.

11. The coating composition of claim 1 wherein reactive component (a) comprises at least one aliphatic-containing structure, at least one aromatic-containing structure, and at least one cycloaliphatic-containing structure.

12. The coating composition of claim 1 wherein reactive component (a) comprises from 3 to 25% by weight aliphatic-containing structures, 3 to 25% by weight aromatic-containing structures, and 50 to 94% by weight cycloaliphatic-containing structures, all based on the total weight of reactive component (a).

13. The coating composition of claim 12 wherein reactive component (a) comprises from 3 to 18% by weight aliphatic compounds, 5 to 23% by weight aromatic containing compounds, and 55 to 85% by weight cycloaliphatic containing compounds, all based on the total weight of reactive component (a).

14. The coating composition of claim 13 wherein reactive component (a) comprises from 5 to 10% by weight aliphatic compounds, 10 to 20% by weight aromatic containing compounds, and 60 to 70% by weight cycloaliphatic containing compounds, all based on the total weight of reactive component (a).

15. The coating composition of claim 1 wherein reactive component (a) comprises from 18 to 54 carbons.

16. The coating composition of claim 15 wherein reactive component (a) comprises 36 to 54 carbons.

17. The coating composition of claim 15 wherein reactive component (a) comprises 36 carbons.

18. The coating composition of claim 1 wherein reactive component (a) has from 2 to 6 functional groups (ii).

19. The coating composition of claim 18 wherein reactive component (a) has 2 functional groups (ii).

20. The coating composition of claim 1 wherein the functional groups (ii) of reactive component (a) are selected from the group consisting of hydroxyl, carbamate, carboxyl, epoxy, cyclic carbonate, amine, aldehyde, aminoplast functional groups, urea, isocyanate (blocked or unblocked), and mixtures thereof.

21. The coating composition of claim 1 wherein the functional groups (ii) of reactive component (a) are selected from the group consisting of hydroxyl, carbamate, carboxyl, epoxy, isocyanate, aminoplast functional groups, and mixtures thereof.

22. The coating composition of claim 20 wherein functional groups (ii) of reactive component (a) are selected from the group consisting of hydroxyl, carbamate and mixtures thereof.

23. The coating composition of claim 1 wherein the crosslinking agent (b) is selected from the group consisting of blocked isocyanates, unblocked isocyanates, aminoplast resins and mixtures thereof.

24. The coating composition of claim 1 wherein the reactive component (a) comprises at least two hydroxyl groups (ii) and crosslinking agent (b) comprises a plurality of isocyanate functional groups.

25. The coating composition of claim 24 wherein the plurality of isocyanate functional groups are blocked isocyanate functional groups.

26. The coating composition of claim 24 wherein reactive component (a)'s functional groups (ii) consist of hydroxyl groups and crosslinking agent (b)'s plurality of functional groups (iii) consist of isocyanate functional groups.

27. The coating composition of claim 1 wherein reactive component (a) comprises at least two carbamate groups (ii) and crosslinking agent (b) is an aminoplast resin.

28. The coating composition of claim 27 wherein reactive component (a)'s functional groups (ii) consist of carbamate groups and crosslinking agent (b) is an aminoplast resin.

29. The coating composition of claim 1 further comprising
   (c) one or more polyfunctional polymeric compounds different from (a) and comprising one or more hydrogen reactive functional groups (iv), and
   (d) one or more crosslinking agents comprising a plurality of functional groups (v) reactive with the functional groups (iv) of compound (c).

30. The coating composition of claim 29 wherein the one or more polyfunctional polymeric compounds (c) have a molecular weight of from 900 to more than 1,000,000.

31. The coating composition of claim 30 wherein the one or more polyfunctional polymeric compounds (c) have a molecular weight of from 900 to 10,000.

32. The coating composition of claim 29 wherein the one or more polyfunctional polymeric compounds (c) have an equivalent weight of from 114 to 2000.

33. The coating composition of claim 29 wherein crosslinking agent (d) is different from crosslinking agent (b).

34. The coating composition of claim 29 wherein the functional groups (iv) of compound (c) and the functional groups (v) of crosslinking agent (d) react to provide a thermally reversible chemical linkage.

35. The coating composition of claim 29 further comprising a polyfunctional polymeric compound (c) comprising functional groups (iv) selected from the group consisting of hydroxyl groups, carbamate groups, carboxyl groups, and mixtures thereof, and crosslinking agent (d) comprises an aminoplast resin.

36. The coating composition of claim 35 wherein functional groups (iv) of polyfunctional polymeric compound (c) are selected from the group consisting of hydroxyl groups, carbamate groups, and mixtures thereof.

37. The coating composition of claim 35 wherein polyfunctional polymeric compound (c)'s functional groups (iv) consist essentially of a mixture of hydroxyl and carbamate functional groups, and crosslinking agent (d) consists essentially of one or more aminoplast resins.

38. The coating composition of claim 35 wherein polyfunctional polymeric compound (c)'s functional groups (iv) consist essentially of hydroxyl groups and crosslinking agent (d) consists essentially of one or more aminoplast resins.

39. The coating composition of claim 35 wherein polyfunctional polymeric compound (c)'s functional groups (iv) consist essentially of carbamate groups and crosslinking agent (d) consists essentially of one or more aminoplast resins.

40. The coating composition of claim 36 wherein functional groups (iv) consist essentially of primary carbamate groups.

41. The coating composition of claim 40 wherein polyfunctional polymeric compound (c) is an oligomeric compound having two primary carbamate groups.

42. The coating composition of claim 41 wherein polyfunctional polymeric compound (c) is the reaction product of an isocyanate functional compound and a compound having an isocyanate reactive functional group and either a carbamate group or a group convertible to a carbamate group.

43. The coating composition of claim 35 wherein polyfunctional polymeric compound (c)'s functional groups (iv) are water dispersible functional groups and crosslinking agent (d) consists essentially of one or more aminoplast resins.

44. The coating composition of claim 29 wherein polyfunctional polymeric compound (c) comprises functional groups (iv) which are hydroxyl groups, and crosslinking agent (d) comprises a plurality of isocyanate groups.

45. The coating composition of claim 44 wherein crosslinking agent (b) and crosslinking agent (d) are the same.

46. The coating composition of claim 29 wherein
   reactive component (a) comprises at least two functional groups (ii) which are hydroxyl,
   crosslinking agent (b) comprises functional groups (iii) which are selected from the group consisting of blocked isocyanate, unblocked isocyanate, and mixtures thereof,
   polyfunctional polymeric compound (c) comprises functional groups (iv) which are selected from the group consisting of carbamate, hydroxyl, and mixtures thereof, and
   crosslinking agent (d) comprises functional groups (v) selected from the group consisting of aminoplast resin functional groups, isocyanate groups, blocked isocyanate groups, and mixtures thereof.

47. The coating composition of claim 46 wherein crosslinking agent (d) is an aminoplast resin.

48. The coating composition of claim 47 wherein the functional groups (iv) of polyfunctional polymeric compound (c) are a mixture of carbamate groups and hydroxyl groups.

49. The coating composition of claim 48 wherein the carbamate groups are primary carbamate groups.

50. The coating composition of claim 47 wherein crosslinking agent (d) is an isocyanate functional resin.

51. The coating composition of claim 50 wherein the functional groups (iv) of polyfunctional polymeric compound (c) are hydroxyl groups.

52. The coating composition of claim 29 wherein
   reactive component (a) comprises at least two functional groups (ii) which are carbamate,
   crosslinking agent (b) comprises functional groups (iii) from one or more aminoplast resins,
   polyfunctional polymeric compound (c) comprises functional groups (iv) which are selected from the group consisting of carbamate, hydroxyl, carboxyl, and mixtures thereof, and
   crosslinking agent (d) comprises at least one member selected from the group consisting of aminoplast resins, isocyanate functional compounds, and mixtures thereof.

53. The coating composition of claim 52 wherein the functional groups (iv) of polyfunctional polymeric compound (c) are hydroxyl groups.

54. The coating composition of claim 53 wherein crosslinking agent (d) is an isocyanate functional compound.

55. The coating composition of claim 54 wherein crosslinking agent (d) is an aminoplast resin.

56. The coating composition of claim 52 wherein the functional groups (iv) of polyfunctional polymeric compound (c) are mixtures of hydroxyl groups and carbamate groups.

57. The coating composition of claim 56 wherein crosslinking agent (d) is an isocyanate functional compound.

58. The coating composition of claim 53 wherein polyfunctional polymeric compound (c) is a hydroxyl functional acrylic resin.

59. The coating composition of claim 52 wherein the functional groups (vi) of polyfunctional polymeric compound (c) are carbamate groups.

60. The coating composition of claim 57 wherein crosslinking agent (d) further comprises an aminoplast resin.

61. The coating composition of claim 59 wherein the carbamate functional groups (iv) of polyfunctional polymeric compound (c) are primary carbamate groups.

62. The coating composition of claim 52 wherein the functional groups (iv) of polyfunctional polymeric compound (c) are water dispersible functional groups selected from the group consisting of hydroxyl, carbamate, carboxyl and mixtures thereof.

63. The coating composition of claim 62 wherein polyfunctional polymeric compound (c) is a water dispersible polymer.

64. A coating composition comprising
   (a) a reactive component which is substantially free of any heteroatoms, comprises a mixture of at least one aliphatic-containing structure, at least one aromatic-containing structure, and at least one cycloaliphatic-containing structure and comprises
      (i) from 12 to 72 carbon atoms, and
      (ii) at least two functional groups, and
   (b) a crosslinking agent comprising a plurality of functional groups (iii) reactive with the functional groups (ii) of compound (a),
wherein functional groups (ii) and (iii) are selected such that reaction there between produces a thermally irreversible chemical linkage.

65. A coating composition comprising
   (a) a reactive component which is substantially free of any heteroatoms and is not a crystalline solid at room temperature comprising
      (i) from 12 to 72 carbon atoms, and
      (ii) at least two carbamate groups, and
   (b) a crosslinking agent is an aminoplast resin comprising a plurality of functional groups (iii) reactive with the functional groups (ii) of reactive component (a),
wherein functional groups (ii) and (iii) are selected such that reaction between them produces a thermally irreversible chemical linkage.

66. A coating composition comprising
   (a) a reactive component which is substantially free of any heteroatoms and is not a crystalline solid at room temperature comprising
      (i) from 12 to 72 carbon atoms, and
      (ii) at least two functional groups, and
   (b) a crosslinking agent comprising a plurality of functional groups (iii) reactive with the functional groups (ii) of reactive component (a),
   (c) one or more polyfunctional polymeric compounds different from (a) and comprising one or more hydrogen reactive functional groups (iv), and
   (d) one or more crosslinking agents comprising a plurality of functional groups (v) reactive with the functional groups (iv) of compound (c),
wherein functional groups (ii) and (iii) are selected such that reaction between them produces a thermally irreversible chemical linkage.

* * * * *